US012663815B2

(12) United States Patent (10) Patent No.: US 12,663,815 B2
Xia et al. (45) Date of Patent: Jun. 23, 2026

(54) THREE-DIMENSIONAL SORTING CONTROL METHOD, THREE-DIMENSIONAL SORTING ROBOT, AND RELATED DEVICE

(71) Applicant: Zhejiang Libiao Robotics Co., Ltd., Hangzhou (CN)

(72) Inventors: Huiling Xia, Zhejiang (CN); Jianqiang Zhu, Zhejiang (CN); Juejing Xu, Zhejiang (CN); Ming Ma, Zhejiang (CN)

(73) Assignee: Zhejiang Libiao Robotics Co., Ltd., Hangzhou (CN)

( * ) Notice: Subject to any disclaimer, the term of this patent is extended or adjusted under 35 U.S.C. 154(b) by 95 days.

(21) Appl. No.: 18/293,149

(22) PCT Filed: Mar. 31, 2022

(86) PCT No.: PCT/CN2022/084624
§ 371 (c)(1),
(2) Date: Jan. 29, 2024

(87) PCT Pub. No.: WO2023/015918
PCT Pub. Date: Feb. 16, 2023

(65) Prior Publication Data
US 2024/0335861 A1 Oct. 10, 2024

(30) Foreign Application Priority Data

Aug. 11, 2021 (CN) ........................ 202110919357.X

(51) Int. Cl.
*G05D 1/69* (2024.01)
*B25J 5/00* (2006.01)
(Continued)

(52) U.S. Cl.
CPC .............. *G05D 1/69* (2024.01); *B25J 9/0084* (2013.01); *B25J 9/1697* (2013.01); *B65G 1/137* (2013.01);
(Continued)

(58) Field of Classification Search
CPC ........... B07C 5/361; B07C 2501/0063; B07C 2301/0016; G06Q 10/08; G06Q 10/087;
(Continued)

(56) References Cited

U.S. PATENT DOCUMENTS 9,751,693 B1 9/2017 Battles et al.
12,111,632 B1* 10/2024 Bansal ............... G05B 19/4155
(Continued)

FOREIGN PATENT DOCUMENTS

CN 105032783 A 11/2015
CN 106302593 A 1/2017
(Continued)

OTHER PUBLICATIONS

Search Report issued by the Chinese Patent Office for Application No. 202110919357X, filed Aug. 11, 2021, p. 1.
(Continued)

*Primary Examiner* — Spencer D Patton
(74) *Attorney, Agent, or Firm* — Warner Norcross + Judd LLP

(57) ABSTRACT

A three-dimensional sorting control method, a three-dimensional sorting robot, and a related device. The three-dimensional sorting control method comprises: three-dimensional sorting robots having a binding relationship with identity information of target sorting shelves, wherein the binding relationship is associated with a target order; under a sorting task of the target order, the three-dimensional sorting robots sorting, according to the identity information of the sorting shelves, goods to be sorted; when a first three-dimensional (Continued)

sorting robot has a fault, unbinding the first three-dimensional sorting robot and the target sorting shelves; acquiring state information of other three-dimensional sorting robots, wherein the state information indicates that a second three-dimensional sorting robot is in an available and idle state; and rebinding the second three-dimensional sorting robot with the target sorting shelves. Therefore, after the three-dimensional sorting robots have a fault, existing idle robots which operate normally are used to rapidly participate in sorting, thereby achieving the technical aim of improving the overall sorting efficiency.

14 Claims, 7 Drawing Sheets

(51) Int. Cl.

| | | |
|---|---|---|
| *B25J 9/00* | (2006.01) | |
| *B25J 9/16* | (2006.01) | |
| *B65G 1/137* | (2006.01) | |
| *B65G 1/04* | (2006.01) | |

(52) U.S. Cl.
CPC ............... *B25J 5/00* (2013.01); *B65G 1/0492* (2013.01); *G05B 2219/45047* (2013.01)

(58) Field of Classification Search
CPC ... G06Q 10/0875; B25J 9/0084; B25J 9/0093; B25J 9/0096; B25J 9/1669; B25J 9/1674; B25J 9/1679; B25J 9/1682; B25J 9/1661; B25J 9/1697; B25J 5/00–04; B65G 1/137–1378; B65G 1/0492; G05D 1/69; G05D 1/692; G05D 1/6987; G05D 1/0287; G05D 1/0291; G05D 1/0297; G05D 2219/45045; G05D 2219/45047; G05B 2219/45045; G05B 2219/45047
See application file for complete search history.

(56) References Cited

U.S. PATENT DOCUMENTS

| | | | | |
|---|---|---|---|---|
| 2018/0130011 | A1* | 5/2018 | Jacobsson | ............ H05K 13/021 |
| 2021/0233013 | A1 | 7/2021 | Liang et al. | |

| | | | | |
|---|---|---|---|---|
| 2022/0161427 | A1* | 5/2022 | Yerazunis | .............. B25J 9/1674 |
| 2022/0374970 | A1* | 11/2022 | Bronicki | ........... G06Q 30/0241 |

FOREIGN PATENT DOCUMENTS

| | | | | | | |
|---|---|---|---|---|---|---|
| CN | 206451194 | U | | 8/2017 | | |
| CN | 206661696 | U | | 11/2017 | | |
| CN | 108376270 | A | | 8/2018 | | |
| CN | 108701285 | A | | 10/2018 | | |
| CN | 109160163 | A | | 1/2019 | | |
| CN | 110262408 | A | | 9/2019 | | |
| CN | 110744569 | A | | 2/2020 | | |
| CN | 112101872 | A | | 12/2020 | | |
| CN | 112974285 | A | | 6/2021 | | |
| CN | 113210294 | A | * | 8/2021 | ............ | B07C 5/342 |
| CN | 113955362 | A | | 1/2022 | | |
| JP | 2008-508165 | A | | 3/2008 | | |
| JP | 2020-527524 | A | | 9/2020 | | |
| JP | 2020-533254 | A | | 11/2020 | | |
| JP | 2021-517678 | A | | 7/2021 | | |
| WO | 2006/019589 | A1 | | 2/2006 | | |
| WO | 2018/061160 | A1 | | 4/2018 | | |
| WO | 2019/071930 | A1 | | 4/2019 | | |
| WO | 2019/223703 | A1 | | 11/2019 | | |
| WO | 2020/165837 | A2 | | 8/2020 | | |
| WO | 2021/016290 | A1 | | 1/2021 | | |
| WO | 2021/149577 | A1 | | 7/2021 | | |
| WO | 2021140577 | A1 | | 7/2021 | | |

OTHER PUBLICATIONS

Supplemental Search Report issued by the Chinese Patent Office for Application No. 202110919357X, filed Aug. 11, 2021, pp. 1-2.
English translation of the International Search Report for International Application No. PCT/CN2022/084624 mailed May 18, 2022, pp. 1-2.
English translation of the Written Opinion for International Application No. PCT/CN2022/084624 mailed May 18, 2022, pp. 1-4.
English language Office Action issued by the Korean Patent Office issued Dec. 29, 2025.

* cited by examiner

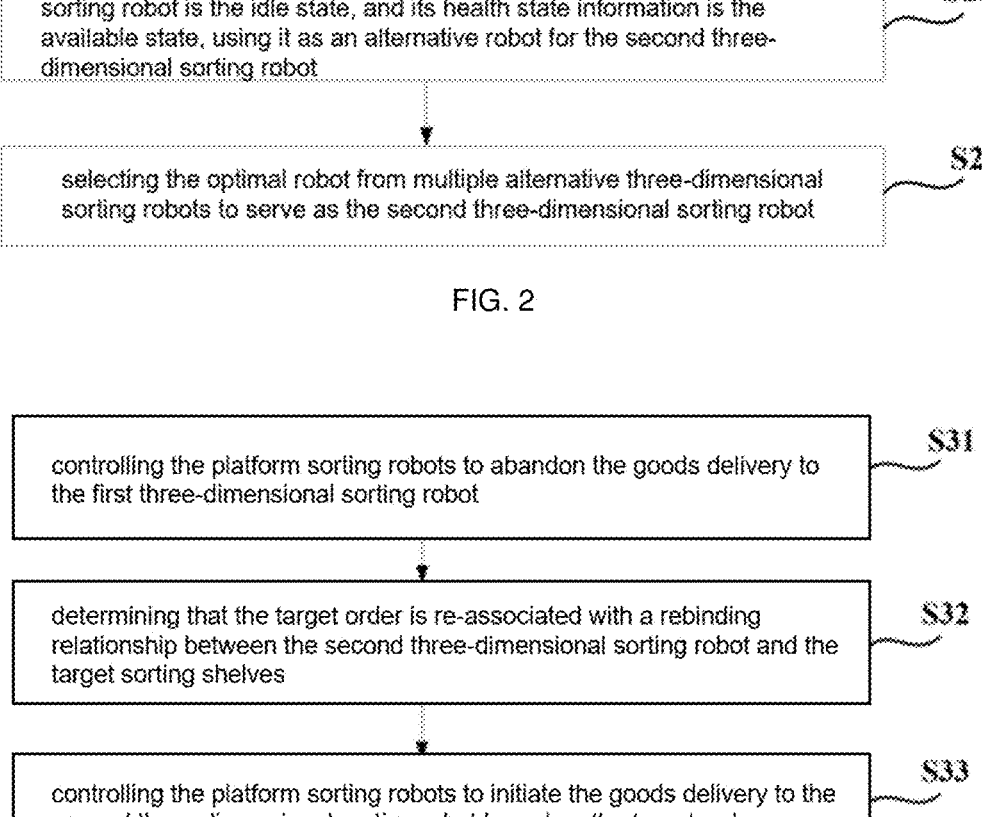

determining that the operational state information of a three-dimensional sorting robot is the idle state, and its health state information is the available state, using it as an alternative robot for the second three-dimensional sorting robot

S21 selecting the optimal robot from multiple alternative three-dimensional sorting robots to serve as the second three-dimensional sorting robot

S22

FIG. 2 controlling the platform sorting robots to abandon the goods delivery to the first three-dimensional sorting robot

S31 determining that the target order is re-associated with a rebinding relationship between the second three-dimensional sorting robot and the target sorting shelves

S32 controlling the platform sorting robots to initiate the goods delivery to the second three-dimensional sorting robot based on the target order

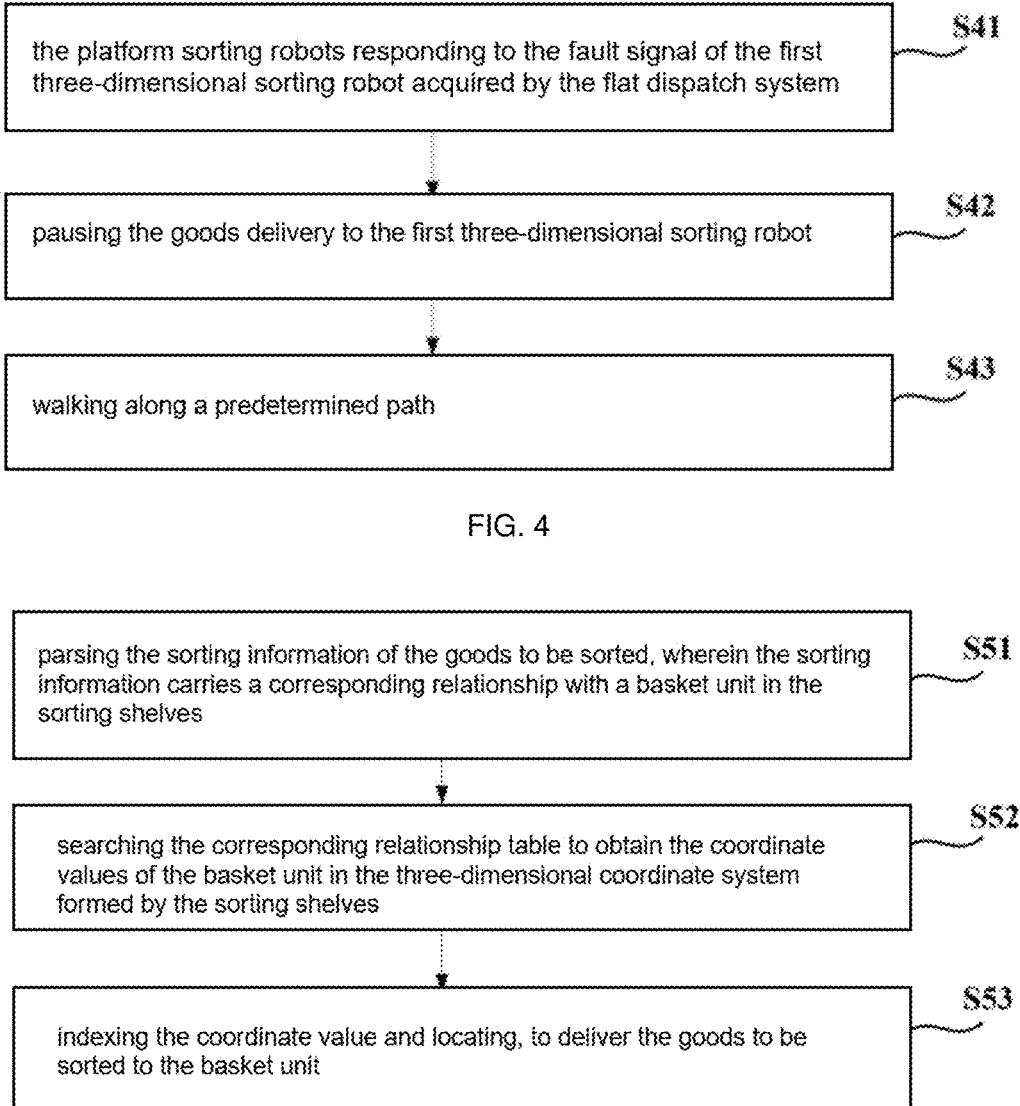

the platform sorting robots responding to the fault signal of the first three-dimensional sorting robot acquired by the flat dispatch system

S41 pausing the goods delivery to the first three-dimensional sorting robot

S42 walking along a predetermined path

S43

FIG. 4 parsing the sorting information of the goods to be sorted, wherein the sorting information carries a corresponding relationship with a basket unit in the sorting shelves

S51 searching the corresponding relationship table to obtain the coordinate values of the basket unit in the three-dimensional coordinate system formed by the sorting shelves

S52 indexing the coordinate value and locating, to deliver the goods to be sorted to the basket unit

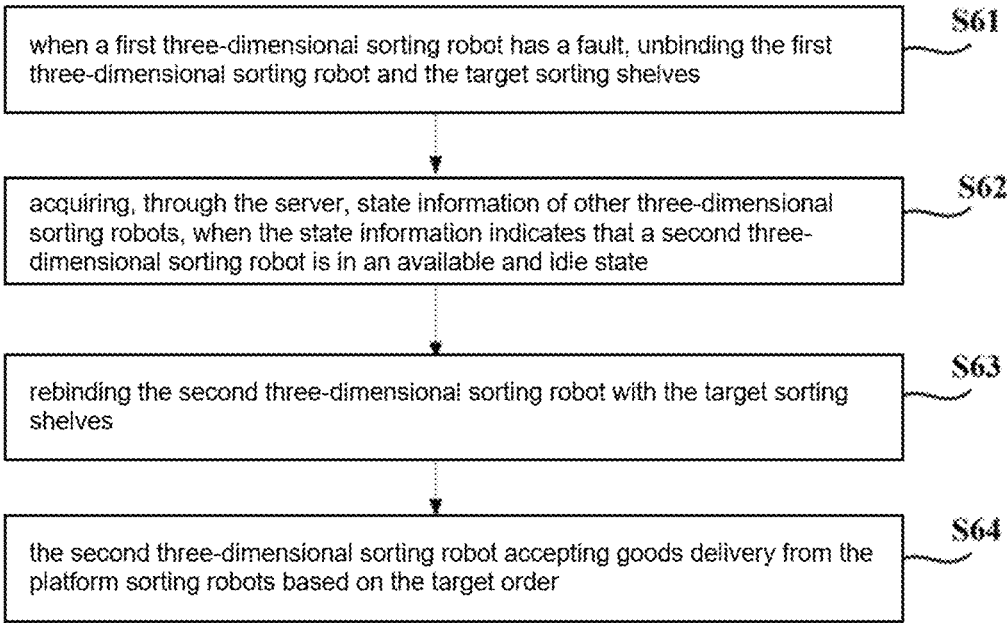

when a first three-dimensional sorting robot has a fault, unbinding the first three-dimensional sorting robot and the target sorting shelves — S61 acquiring, through the server, state information of other three-dimensional sorting robots, when the state information indicates that a second three-dimensional sorting robot is in an available and idle state — S62 rebinding the second three-dimensional sorting robot with the target sorting shelves — S63 the second three-dimensional sorting robot accepting goods delivery from the platform sorting robots based on the target order — S64

FIG. 6

THREE-DIMENSIONAL SORTING CONTROL METHOD, THREE-DIMENSIONAL SORTING ROBOT, AND RELATED DEVICE

CROSS-REFERENCE TO RELATED APPLICATIONS

The present disclosure claims the priority to the Chinese patent application with the filling No. 202110919357.X filed with the Chinese Patent Office on Aug. 11, 2021, and entitled "THREE-DIMENSIONAL SORTING CONTROL METHOD, THREE-DIMENSIONAL SORTING ROBOT, AND RELATED DEVICE", the contents of which are incorporated herein by reference in entirety.

TECHNICAL FIELD

The present disclosure relates to the technical field of sorting robots, and in particular to a three-dimensional sorting control method, a three-dimensional sorting robot, and a related device.

BACKGROUND ART

A sorting robot, equipped with sensors and identification mechanisms, capable of executing sorting actions, is used for rapidly sorting goods. The existing sorting robots are divided into platform-type sorting robots or sorting robotic arms. In distribution centers, parcels are placed from bags onto the conveyor belt. Upon reaching the position of the corresponding sorting bag at the destination, the sorting is completed by making the parcels drop down or grabbing the parcels from the conveyor belt and putting them into the sorting bag at the destination.

The current flat sorting systems, once deployed, can efficiently handle sorting tasks. However, three-dimensional sorting systems offer improved sorting efficiency and are increasingly applied. For the current three-dimensional sorting systems, the problem of not being able to quickly solve the faults has become a hindrance to the application and the promotion.

SUMMARY

The embodiments of the present disclosure provide a three-dimensional sorting control method, three-dimensional sorting robot, and related device to achieve the technical objectives of improving sorting efficiency and enabling rapid maintenance of faults.

A three-dimensional sorting control method for a three-dimensional sorting system is provided, wherein system can include multiple three-dimensional sorting robots and sorting shelves, wherein the three-dimensional sorting control method can include the three-dimensional sorting robots having a binding relationship with the identity information of target sorting shelves, wherein the binding relationship can be associated with a target order; under a sorting task of the target order, the three-dimensional sorting robots sorting, according to the identity information of the sorting shelves, goods to be sorted;

when a first three-dimensional sorting robot has a fault, unbinding the first three-dimensional sorting robot and the target sorting shelves;

acquiring state information of other three-dimensional sorting robots, when the state information indicates that a second three-dimensional sorting robot is in an available and idle state;

and rebinding the second three-dimensional sorting robot with the target sorting shelves.

Optionally, the three-dimensional sorting system can further include one or more platform sorting robots, wherein the platform sorting robots can perform goods delivery to the first three-dimensional sorting robot based on the target order; and when the first three-dimensional sorting robot has a fault, the method can further include controlling the platform sorting robots to abandon the goods delivery to the first three-dimensional sorting robot;

determining that the target order is re-associated with a rebinding relationship between the second three-dimensional sorting robot and the target sorting shelves; and controlling the platform sorting robots to initiate the goods delivery to the second three-dimensional sorting robot based on the target order.

Optionally, the step of acquiring state information of other three-dimensional sorting robots can include determining the operational state information and health state information of multiple three-dimensional sorting robots, wherein the operational state information can include, but is not limited to, idle state, in-use state, and standby state; the health state information can include, but is not limited to, fault state, available state, and test state;

determining that the operational state information of a three-dimensional sorting robot is the idle state, and its health state information is the available state, using it as an alternative robot for the second three-dimensional sorting robot; and selecting the optimal robot from multiple alternative three-dimensional sorting robots to serve as the second three-dimensional sorting robot.

Optionally, after rebinding the second three-dimensional sorting robot with the target sorting shelves, the three-dimensional sorting control method can further include acquiring the sorting state when the first three-dimensional sorting robot has a fault, wherein the sorting state can include incomplete sorting of the target sorting shelves and incomplete unloading of baskets of the target sorting shelves;

when the target sorting shelves are not completely sorted, binding the second three-dimensional sorting robot with the target sorting shelves; and when the unloading of baskets of the target sorting shelves is not completed, placing the goods with incomplete unloading onto the second three-dimensional sorting robot.

Optionally, the step of controlling the platform sorting robots to abandon the goods delivery to the first three-dimensional sorting robot includes the platform sorting robots responding to the fault signal of the first three-dimensional sorting robot acquired by the flat dispatch system;

pausing the goods delivery to the first three-dimensional sorting robot; and walking along a predetermined path until the binding between the second three-dimensional sorting robot and the target sorting shelves is completed.

Optionally, the three-dimensional sorting robots can have a binding relationship with the identity information of target sorting shelves, wherein the identity information of target sorting shelves is realized by the three-dimensional sorting robot using RFID readers, which can include reading the labels arranged on the target sorting shelves to obtain the identity information, wherein the labels can carry structural data of the sorting shelves and/or location information of the basket units, wherein the structural data of the sorting shelves indicates the longitudinal and transverse structure of the sorting shelves and information about available baskets; and the location information of the basket units indicates the positions of the basket units in the coordinate system formed by the sorting shelves.

Optionally, the step of three-dimensional sorting robots sorting, according to the identity information of the sorting shelves, goods to be sorted, can include parsing the sorting information of the goods to be sorted, wherein the sorting information carries a corresponding relationship with a basket unit in the sorting shelves;

searching the corresponding relationship table to obtain the coordinate values of the basket unit in the three-dimensional coordinate system formed by the sorting shelves; and indexing the coordinate value and locating, to deliver the goods to be sorted to the basket unit.

Optionally, the three-dimensional sorting system can further include a control bus, and the step of acquiring state information of other three-dimensional sorting robots can include acquiring state information of other three-dimensional sorting robots on the control bus.

A three-dimensional sorting robot is provided, wherein the three-dimensional sorting robot can be configured in the three-dimensional sorting system and can have a binding relationship with identity information of target sorting shelves, and the binding relationship can be associated with a target order. Under a sorting task of the target order, the three-dimensional sorting robots sort, according to the identity information of the sorting shelves, goods to be sorted;

when a first three-dimensional sorting robot has a fault, the first three-dimensional sorting robot can unbind with the target sorting shelves;

the server acquires state information of other three-dimensional sorting robots, when the state information indicates that a second three-dimensional sorting robot is in an available and idle state; and the second three-dimensional sorting robot can rebind with the target sorting shelves.

Optionally, the three-dimensional sorting system can further include one or more platform sorting robots, wherein the platform sorting robots can perform goods delivery to the first three-dimensional sorting robot based on the target order;

when the first three-dimensional sorting robot has a fault, the platform sorting robots can abandon the goods delivery to the first three-dimensional sorting robot and periodically interrogate the state of the target order; and when the target order is re-associated with a rebinding relationship between the second three-dimensional sorting robot and the target sorting shelves, the second three-dimensional sorting robot accepts goods delivery from the platform sorting robots based on the target order.

Optionally, in the operational state information and health state information of multiple three-dimensional sorting robots, the operational state information can include, but is not limited to, idle state, in-use state, and standby state; and the health state information can include but is not limited to, fault state, available state, and test state, wherein when the operational state information of a three-dimensional sorting robot is the idle state and health state information is the available state, the three-dimensional sorting robot is used as an alternative robot for the second three-dimensional sorting robot; and a predetermined rule is used to select the optimal robot from multiple alternative three-dimensional sorting robots to serve as the second three-dimensional sorting robot.

Optionally, the three-dimensional sorting robots can have a binding relationship with the identity information of target sorting shelves, wherein the identity information of target sorting shelves can be realized by the three-dimensional sorting robot using RFID readers in the following method:

reading the labels arranged on the target sorting shelves to obtain the identity information, wherein the labels can carry structural data of the sorting shelves and/or location information of the basket units, wherein the structural data of the sorting shelves indicates the longitudinal and transverse structure of the sorting shelves and information about available baskets; and the location information of the basket units indicates the position of the basket units in the coordinate system formed by the sorting shelves.

Optionally, the three-dimensional sorting robot can be arranged in the three-dimensional sorting system via a bus structure.

A three-dimensional sorting control system, wherein the system can be configured in the three-dimensional sorting system, and the three-dimensional sorting control system can perform the three-dimensional sorting control method described above.

Optionally, the system can perform through a server the aforementioned three-dimensional sorting control method in the three-dimensional sorting control system.

Optionally, the three-dimensional sorting control system can be provided with a host computer or central controller to allocate sorting tasks to the three-dimensional sorting robot.

A computing device, including at least one processor; and a memory communicatively connected to the at least one processor, wherein the memory stores instructions that can be executed by the at least one processor, and the instructions are executed by the at least one processor to enable the at least one processor to perform the three-dimensional sorting method as described above.

Disclosed in the present disclosure are a three-dimensional sorting control method, a three-dimensional sorting robot, and a related device. The method includes when a first three-dimensional sorting robot has a fault, unbinding the first three-dimensional sorting robot and the target sorting shelves; acquiring state information of other three-dimensional sorting robots, wherein the state information indicates that a second three-dimensional sorting robot is in an available and idle state; and rebinding the second three-dimensional sorting robot with the target sorting shelves. Therefore, after the three-dimensional sorting robots have a fault, existing idle robots that operate normally are used to rapidly participate in sorting, thereby achieving the technical aim of improving the overall sorting efficiency.

BRIEF DESCRIPTION OF DRAWINGS

The drawings depicted herein are provided to offer a further understanding of the present disclosure and constitute a part of the present disclosure. The illustrative embodiments and their descriptions serve to explain the present disclosure and do not constitute undue limitations on the present disclosure. In the drawings.

FIG. 2 is a flowchart of the process of the three-dimensional sorting control method in the embodiment of the present disclosure;

FIG. 3 is a flowchart of the process of the three-dimensional sorting control method in the embodiment of the present disclosure;

FIG. 4 is a flowchart of the process of the three-dimensional sorting control method in the embodiment of the present disclosure;

FIG. 5 is a flowchart of the process of the three-dimensional sorting control method in the embodiment of the present disclosure;

FIG. 6 is a schematic diagram of the execution process based on a three-dimensional sorting robot in the embodiment of the present disclosure;

DETAILED DESCRIPTION OF EMBODIMENTS

The embodiments of the present disclosure provide a three-dimensional sorting control method, three-dimensional sorting robot, and related device to achieve the technical objectives of improving sorting efficiency and enabling rapid maintenance of faults.

Figure 1A:
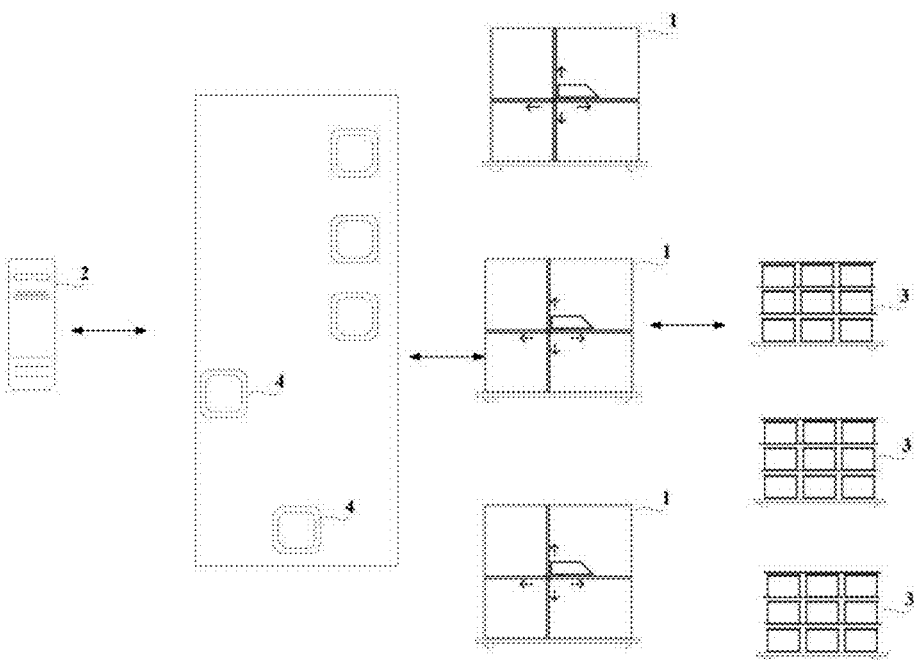
FIG. 1a is a schematic diagram of the structure of a three-dimensional sorting system in the embodiment of the present disclosure.

For ease of understanding, illustration for the embodiment of the present disclosure is based on the structure shown in FIG. 1a, but this does not imply that the structure shown in FIG. 1a limits the scope of the present disclosure.

In conjunction with FIG. 1a, the following description is given for the three-dimensional sorting system provided by the embodiments of the present disclosure. In the present disclosure, multiple three-dimensional sorting robot 1, a server 2, and sorting shelves 3 are provided. As an optional embodiment, three-dimensional sorting robot 1 is provided and mounted in the sorting region in an active manner through a bus (such as CAN). The sorting shelves are in contacted communication with the three-dimensional sorting robots. Of course, it is also possible to achieve data exchange through wireless means without physical contact. This is not limited herein. The three-dimensional sorting robot 1 can be provided with a support frame structure and use lateral motion mechanism and vertical motion mechanism to identify the sorting shelves having multi-layered three-dimensional structures and execute sorting tasks. At the same time, the three-dimensional sorting robot 1 can be provided with a flipping board or a structure assembly for putting goods into the sorting shelves. It can collaborate with desktop sorting robots or platform sorting robots 4 for sorting tasks based on some batch order. The server 2 is configured to control sorting batches, sorting orders, and multiple three-dimensional sorting robots within the local area network or region. It also establishes the binding relationships between the three-dimensional sorting robots and the sorting shelves, which is specifically the binding for a particular batch and order. In the present disclosure, the server can utilize wired or wireless methods to complete the control and the state interrogation of each sorting robot in the three-dimensional sorting system, which includes but is not limited to bus control methods.

Figure 1B:
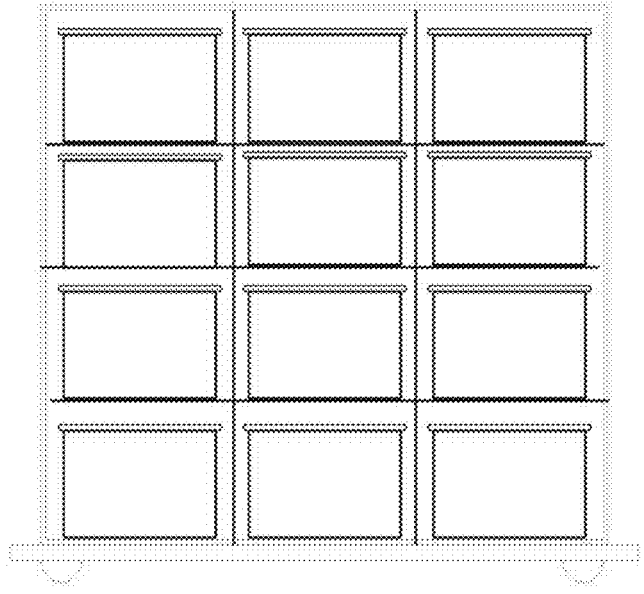
FIG. 1b is a schematic diagram of the structure of three-dimensional sorting shelves in the embodiment of the present disclosure.
Figure 1C:
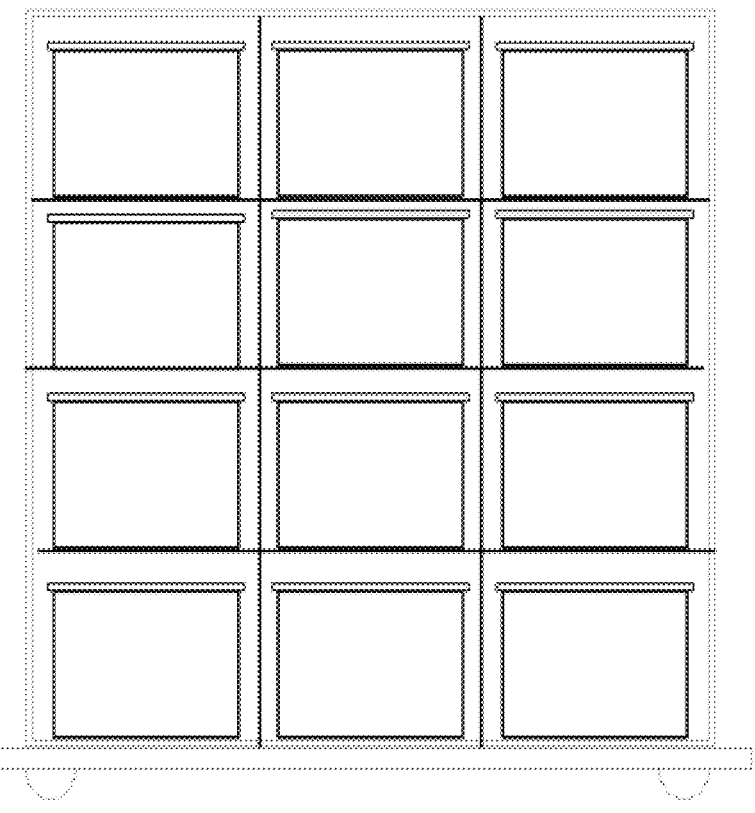
FIG. 1c is a schematic diagram of the structure of the three-dimensional sorting shelves in the embodiment of the present disclosure.

Referring to FIG. 1b-1c, in the present disclosure, the sorting shelves can be sorting shelves or baskets of any structure or shape. Conventional sorting shelves or baskets are configured based on different products or sorting lines. The structures of sorting shelves are not uniform, which even are composed of multiple shelves joined together.

Figure 1D:
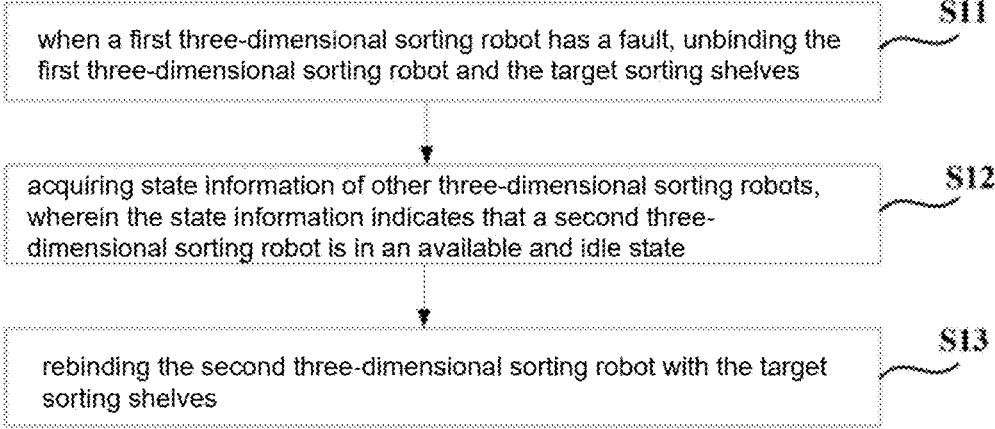
FIG. 1d is a flowchart of the process of the three-dimensional sorting control method in the embodiment of the present disclosure.

Based on this, with reference to FIG. 1d, the three-dimensional sorting control method in the present disclosure includes three-dimensional sorting robots having a binding relationship with the identity information of target sorting shelves, wherein the binding relationship is associated with a target order; and under a sorting task of the target order, the three-dimensional sorting robots sorting, according to the identity information of the sorting shelves, goods to be sorted. It should be noted that, in the sorting task of a specific order A002, the order A002 has sorting tasks of 10,000 pieces. The three-dimensional sorting robots, during the sorting process, need to be bound to the target sorting shelf 001 to accomplish precise sorting of the goods in the task order A002.

In a three-dimensional sorting system, a three-dimensional sorting shelf generally refers to a shelf structure with at least two or more layers. The shelves are regularly arranged with basket units. However, in the practical application of the sorting shelves in the present disclosure, specific structures and the number of layers is not limited. Referring to the illustration in FIG. 1c, in a three-dimensional sorting system, the number of the sorting shelves is multiple. For instance, the current target sorting shelf is labeled as 001, and its identity information includes at least the structural data of the sorting shelf. For instance, the structure of the sorting shelf 001 has 4 rows and 3 columns. After it is recognized by the three-dimensional sorting robots, the goods to be sorted need to be placed in the basket located at the 3rd row and 2nd column. The three-dimensional sorting robots only need to place the goods according to their structure and position. The structural data can also be differentiated based on the type of sorting shelf. For example, the X001 type refers to a rectangular sorting shelf with a structure of 4 rows and 3 columns, and the Y001 type refers to a rectangular sorting shelf with a structure of 8 rows and 5 columns.

S11: when a first three-dimensional sorting robot has a fault, unbinding the first three-dimensional sorting robot and the target sorting shelves.

In the embodiment, in the three-dimensional sorting system, multiple three-dimensional sorting robots simultaneously perform ordered sorting tasks under the control of the bus. When a certain three-dimensional sorting robot experiences a mechanical fault or a signal fault, it will send a fault feedback signal to the server. At this point, it is necessary to unbind the binding relationship between the first three-dimensional sorting robots and the target sorting shelves so as to enable the target sorting shelves to continue to complete the sorting task of the order.

Optionally, in a system controlled by coordination between the server and the CAN bus, the binding relationship between the first three-dimensional sorting robot and the sorting shelves is achieved by inserting the current shelf into the sorting robot workstation. Unbinding the binding relationship between the current shelf and the first three-dimensional sorting robot is achieved by pulling out the current shelf from the first three-dimensional sorting robot. It should be emphasized that this approach is a preferred one.

S12: acquiring state information of other three-dimensional sorting robots, wherein the state information indicates that a second three-dimensional sorting robot is in an available and idle state.

Due to the simultaneous participation of multiple three-dimensional sorting robots in sorting within the sorting region, the state of other three-dimensional sorting robots can be obtained by means of bus interrogation, including determining the operational state information and health state information of multiple three-dimensional sorting robots, wherein the operational state information includes, but is not limited to, idle state, in-use state, and standby state; and the health state information includes, but is not limited to, fault state, available state, and test state. To ensure the normal completion of orders, it is necessary to select three-dimensional sorting robots that are in an idle state and available state for the re-sorting of the target sorting shelves.

Referring to FIG. 2, when multiple three-dimensional sorting robots meet the criteria, the following steps are performed.

S21: determining that the operational state information of a three-dimensional sorting robot is the idle state, and its health state information is the available state, using it as an alternative robot for the second three-dimensional sorting robot.

S22: selecting the optimal robot from multiple alternative three-dimensional sorting robots to serve as the second three-dimensional sorting robot.

More specifically, among the multiple alternative three-dimensional sorting robots, the second three-dimensional sorting robot can be selected through the optimal path, optimal health status, etc. In a system controlled by coordination between the server and the CAN bus, the selection of the second three-dimensional sorting robot can be achieved by operators performing on-site selection on the second three-dimensional sorting robot for plug-in operation at the sorting region, thus completing the rebinding.

S13: rebinding the second three-dimensional sorting robot with the target sorting shelves.

After rebinding, the second three-dimensional sorting robot takes over to complete the sorting task of the first three-dimensional sorting robot and the target sorting shelves for the target order.

In the embodiment, on the server side, for managing and collecting data on batches, orders, and order completion situation, the server needs to store the identity information of each sorting shelf or basket in the embodiment. It also stores and updates the relationship between the three-dimensional sorting robots, the order executed, and the bound three-dimensional sorting shelf or basket (first sorting shelf and second sorting shelf).

Referring to FIG. 1a, in the three-dimensional sorting system of this solution, the sorting robots running in the plane are responsible for delivering the goods to be sorted to the sorting mechanism of the three-dimensional sorting robots. Additionally, one three-dimensional sorting system is configured with one or more platform sorting robots cooperating with the three-dimensional sorting robots, wherein the platform sorting robots perform goods delivery to the first three-dimensional sorting robot based on the target order.

Referring to FIG. 3, when the first three-dimensional sorting robot has a fault, the method further includes the following steps.

S31: controlling the platform sorting robots to abandon the goods delivery to the first three-dimensional sorting robot.

In the embodiments of the present disclosure, the server can be configured as needed and can be divided into an order server and a sorting server. The platform sorting robots transmit fault signals for the first three-dimensional sorting robot through the server. They cannot continue the delivery action to the first three-dimensional sorting robot under the target order.

More specifically, FIG. 4 is referred to.

S41: the platform sorting robots responding to the fault signal of the first three-dimensional sorting robot acquired by the flat dispatch system.

The flat dispatch system centrally allocates and controls the platform sorting robots. The flat dispatch system can be embedded in the server or deployed in a separate server, which is not limited.

S42: pausing the goods delivery to the first three-dimensional sorting robot.

S43: walking along a predetermined path.

For example, five platform sorting robots PM001-PM005 perform delivery actions to the first three-dimensional sorting robot. However, when the first three-dimensional sorting robot has a fault, the platform sorting robots need to continue walking on the plane without performing delivery actions. The specific path can be walking in place or moving back and forth around a track, and it is not limited.

S32: determining that the target order is re-associated with a rebinding relationship between the second three-dimensional sorting robot and the target sorting shelves.

In this scenario, the platform sorting robots are interconnected with the vehicle server. When the vehicle server receives rebinding relationships from the order server, the platform sorting robots acquire instructions for continuing the target order. The instructions carry the order number of the target order, and the identity information, and the position information of the second three-dimensional sorting robot that has been rebound.

S33: controlling the platform sorting robots to initiate the goods delivery to the second three-dimensional sorting robot based on the target order.

The platform sorting robots PM001-PM005, in accordance with the execution sequence, recognize the identity information and position information of the second three-dimensional sorting robot and deliver the goods to be sorted to it.

For the first sorting robot and the second sorting robot, the principle of sorting is described as follows. Under the sorting task of the target order, the goods to be sorted are sorted according to the identity information of the shelf.

In the embodiment, the three-dimensional sorting robots need to follow the control of the server for the orders and sorting tasks that they are to complete. The sorting target for the three-dimensional sorting robots is goods, and the target positions are determined based on the identity information of the sorting shelves or baskets mentioned above.

In the embodiment, to acquire more detailed information about the sorting shelves, it further includes: acquiring attribute data of the basket units of the sorting shelves, including one or a combination of more of size data, volume data, and type data. For allocation of goods to be sorted into baskets for quick and appropriate sorting, it is necessary to acquire the dimensions, volume, and type of each basket unit for corresponding sorting task assignments.

Based on the attribute data, the goods to be sorted in the target order are matched, and a corresponding relationship table between the goods to be sorted and the basket units is generated.

Each of goods to be sorted has a corresponding relationship with one or more basket units based on the sorting task. The sorting robot completes precise sorting based on the corresponding relationship.

For the acquisition step in FIG. 1, the RFID can be configured for reading the labels arranged on the target sorting shelves to obtain the identity information, wherein the labels can carry structural data of the sorting shelves and/or location information of the basket units.

Certainly, the RFID tag cards configured on the target sorting shelf may only contain the ID of that target sorting shelf. Its structural data and/or the position information of the basket units can be stored on the server for acquisition by the three-dimensional sorting robots.

The structural data of the sorting shelves indicate the longitudinal and transverse structure of the sorting shelves and information about available baskets.

The location information of the basket units indicates the position of the basket units in the coordinate system formed by the sorting shelves.

The above-mentioned form of RFID reading is a preferred implementation for the active sorting shelves configured in the three-dimensional sorting system. When the sorting robot 001 receives the sorting task for a specific order A002, for efficiently completing the sorting, nine active sorting shelves (X010-X090) are assigned to the sorting robot 001 to complete the order.

When the active sorting shelf of type X001 is involved in sorting, the sorting robot 001 reads the RFID tag of the active sorting shelf X010. It reads that the target rectangular sorting shelf is of type X001 (X001 type is a rectangular sorting shelf with 4 rows and 3 columns). By reading, it is determined that the target sorting shelf has 12 available baskets with four horizontal ones and three vertical ones. When the target sorting shelf is divided based on the coordinate system, the 12 available baskets can be labeled as X1Y1 (1,1) representing the basket of first row and first column, X1Y2 (1,2) representing the basket of first row and second column, and so on, up to X4Y3 (4,3) representing the basket of fourth row and third column.

It is important to note that during the execution of the target order A002, the binding relationship between the three-dimensional sorting robot and the target sorting shelves is unique. In other words, the sorting robot 001 completes the sorting of the active sorting shelf X010 and then proceeds to the sorting of the active sorting shelf X020. Therefore, when the first sorting robot, i.e., sorting robot 001, has a fault and is unbound from the target sorting shelf, i.e., active sorting shelf X010, the second sorting robot, i.e., sorting robot 008, is selected to rebind with the active sorting shelf X010. It is then associated with the order A002 to continue the sorting process.

Referring to FIG. 5, the sorting step can be carried out by the following embodiment.

S51: parsing the sorting information of the goods to be sorted, wherein the sorting information carries a corresponding relationship with a basket unit in the sorting shelves.

S52: searching the corresponding relationship table to obtain the coordinate values of the basket unit in the three-dimensional coordinate system formed by the sorting shelves.

S53: indexing the coordinate value and locating, to deliver the goods to be sorted to the basket unit.

The above steps are based on the illustrations and examples provided for FIGS. 1 and 2. However, they are not limited to the method of using RFID to read identity information and finding corresponding relationship tables to complete the delivery of some goods to be sorted.

Referring to FIG. 6 and in conjunction with FIG. 1a, in the embodiments of the present disclosure, further disclosed is a three-dimensional sorting robot, configured in a three-dimensional sorting system (referring to the illustration in FIG. 1a) and having a binding relationship with identity information of target sorting shelves, wherein the binding relationship is associated with a target order. Under the sorting task of the target order, the goods to be sorted are sorted according to the identity information of the shelf.

S61: when a first three-dimensional sorting robot has a fault, unbinding the first three-dimensional sorting robot and the target sorting shelves.

Due to the simultaneous participation of multiple three-dimensional sorting robots in sorting within the sorting region, the three-dimensional sorting robots can be arranged in the three-dimensional sorting system via a bus structure. The state of other three-dimensional sorting robots can be obtained by server-to-bus interrogation.

Optionally, in a system controlled by coordination between the server and the CAN bus, the binding relationship between the current shelf and the sorting robot is achieved by inserting the current shelf into the sorting robot workstation. Unbinding the binding relationship between the current shelf and the sorting robot is achieved by pulling out the current shelf from the sorting robot. It should be emphasized that this approach is a preferred one.

The three-dimensional sorting robot 1 can be provided with a support frame structure and use lateral motion mechanism and vertical motion mechanism to identify the sorting shelves having multi-layered three-dimensional structures and execute sorting tasks. At the same time, the three-dimensional sorting robot 1 can be provided with a flipping board or a structure assembly for putting goods into the sorting shelves. Optionally, the three-dimensional sorting robots have a binding relationship with the identity information of target sorting shelves, wherein the identity information of target sorting shelves is realized by the three-dimensional sorting robot using RFID readers, specifically as follows. The labels arranged on the target sorting shelves are read to obtain the identity information, wherein the labels can carry structural data of the sorting shelves and/or location information of the basket units. The structural data of the sorting shelves indicates the longitudinal and transverse structure of the sorting shelves and information about available baskets. The location information of the basket units indicates the position of the basket units in the coordinate system formed by the sorting shelves.

The fault of the first sorting robot can be a mechanical fault or an electrical fault, such as an inability to perform delivery tasks normally, structural faults, or an inability to read the identity information of the sorting shelf.

S62: acquiring, through the server, state information of other three-dimensional sorting robots, when the state information indicates that a second three-dimensional sorting robot is in an available and idle state.

Optionally, in the operational state information and health state information of multiple three-dimensional sorting robots, the operational state information includes, but is not limited to, idle state, in-use state, and standby state; and the health state information includes but is not limited to, fault state, available state, and test state.

When the operational state information of a three-dimensional sorting robot is the idle state and health state information is the available state, the three-dimensional sorting robot is used as an alternative robot for the second three-dimensional sorting robot.

A predetermined rule is used to select the optimal robot from multiple alternative robots to serve as the second three-dimensional sorting robot.

S63: rebinding the second three-dimensional sorting robot with the target sorting shelves.

Optionally, the three-dimensional sorting system further includes one or more platform sorting robots, wherein the platform sorting robots perform goods delivery to the first three-dimensional sorting robot based on the target order.

When the first three-dimensional sorting robot has a fault, the platform sorting robots abandon the goods delivery to the first three-dimensional sorting robot and periodically interrogate the state of the target order.

The target order is re-associated with a rebinding relationship between the second three-dimensional sorting robot and the target sorting shelves.

S64: the second three-dimensional sorting robot accepting goods delivery from the platform sorting robots based on the target order.

Figure 7:
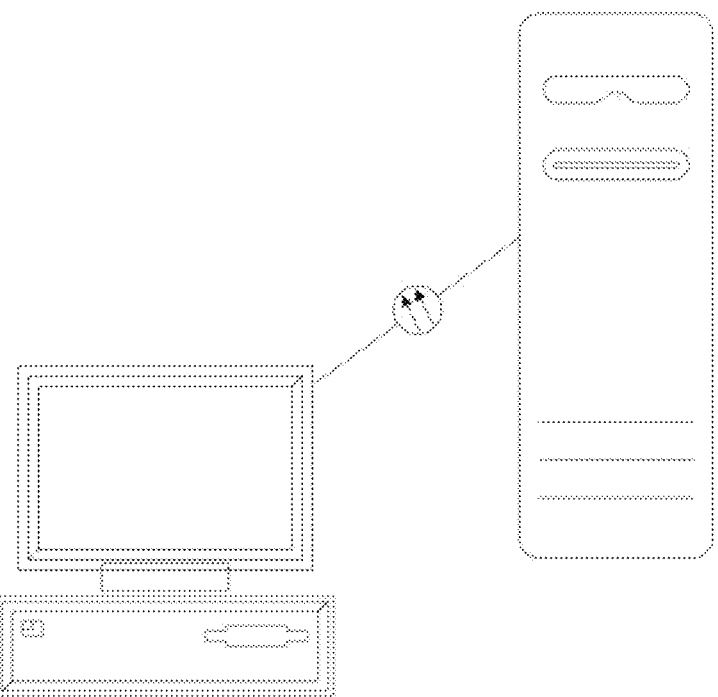
FIG. 7 is a structural schematic diagram of the three-dimensional sorting system in the embodiment of the present disclosure.

Referring to FIG. 7, a three-dimensional sorting control system is illustrated, and the system is configured in a three-dimensional sorting system.

The three-dimensional sorting control system executes the three-dimensional sorting control method as shown in FIGS. 1 to 5 and its corresponding three-dimensional sorting control method described above. The three-dimensional sorting control system can achieve control through one or multiple sets of servers. It can also be provided with a host computer or a central controller to complete the allocation of sorting tasks to the three-dimensional sorting robots. For specific control methods, the diagrams and explanations in FIGS. 1 to 5 are referred to; and further details are not repeated in the embodiment.

Figure 8:
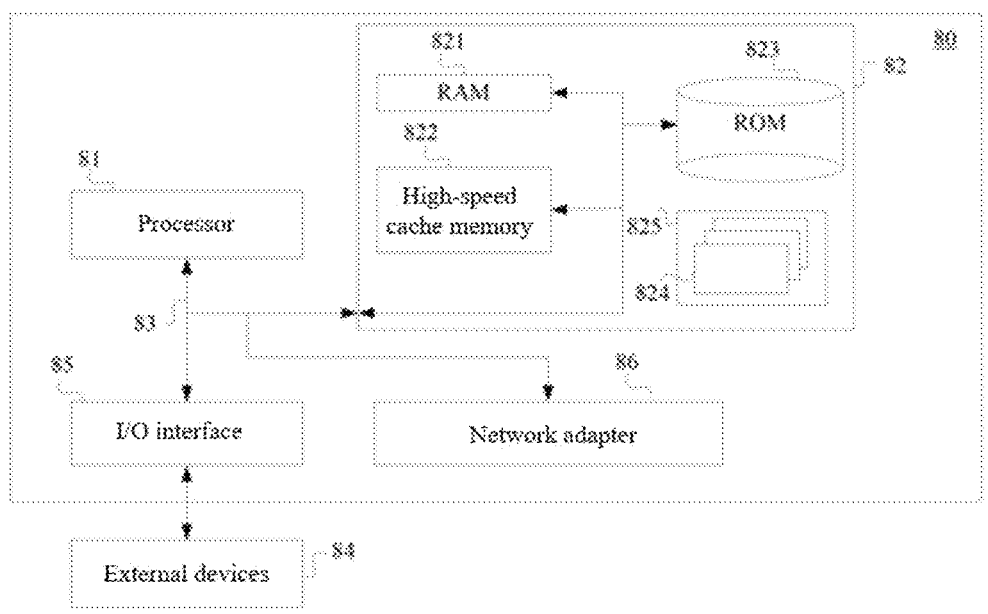
FIG. 8 is a structural schematic diagram of the computing device in the embodiment of the present disclosure.

FIG. 8 illustrates the computing device 80 that corresponds to the methods shown in FIGS. 1 to 5, including the following components.

It should be noted that the computing device 80 shown in FIG. 8 is just an example and should not impose any limitations on the functionality and scope of use of the embodiments of the present disclosure.

As shown in FIG. 8, the server is represented in the form of a general-purpose computing device 80 as preferred. The components of the computing device 80 can include, but are not limited to, the aforementioned at least one processor 81, the aforementioned at least one memory 82, and a bus 83 connecting various system components, including the memory 82 and the processor 81.

The bus 83 represents one or more types of bus structures, including a memory bus or memory controller, a peripheral bus, a processor, or a local bus using any of a variety of bus structures.

The memory 82 can include volatile memory in the form of readable media, such as random access memory (RAM) 821 and/or high-speed cache memory 822, and can further include read-only memory (ROM) 823.

The memory 82 can also include program/application tool 825 having a set (at least one) of program modules 824. The program modules 824 include, but are not limited to an operating system, one or more application programs, other program modules, and program data. Each of these examples or any combination thereof can include an implementation in a network environment.

The computing device 80 can also communicate with one or more external devices 84 (such as a keyboard, pointing device, etc.) and can also communicate with one or more devices that allow a user to interact with computing device 80, and/or with any device that enables computing device 80 to communicate with one or more other computing devices (such as routers, modems, etc.). This communication can be facilitated through an input/output (I/O) interface 85. Additionally, the computing device 80 can communicate with one or more networks (e.g., local area network (LAN), wide area network (WAN), and/or public networks, such as the Internet) via a network adapter 88. As shown in the figure, the network adapter 88 communicates with other modules for computing device 80 via bus 83. It should be understood that, although not depicted in the figure, other hardware and/or software modules can be employed in conjunction with computing device 80, including but not limited to microcode, device drivers, redundant processors, external disk drive arrays, RAID systems, tape drives, and data backup storage systems, among others.

In some possible embodiments, the computing device according to the present disclosure can include at least one processor and at least one memory (such as the first server). The memory stores program code, and when the program code is executed by the processor, it causes the processor to perform the steps of the system privilege activation method described in various exemplary embodiments of the present disclosure as described in the summary.

Figure 9:
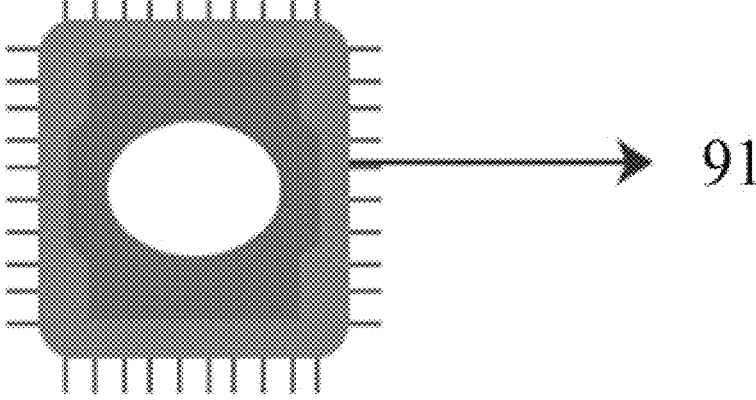
FIG. 9 is a structural schematic diagram of the readable medium in the embodiment of the present disclosure.

Referring to FIG. 9, the three-dimensional sorting control method is depicted in FIGS. 1-5 and corresponding embodiments can also be implemented through a computer-readable medium 91. As shown in FIG. 9, it stores computer-executable instructions, i.e., program instructions required for the three-dimensional sorting control system in the present disclosure. The computer or high-speed chip can execute the instructions to perform the three-dimensional sorting control method described in the embodiments.

The readable signal medium can include data signals propagated in the baseband or as part of a carrier, carrying readable program code. The propagated data signals can take various forms, including but not limited to electromagnetic signals, optical signals, or any suitable combination thereof. The readable signal medium can also be any readable medium other than a readable storage medium, and the medium can send, propagate, or transmit programs for use or combination with instruction execution systems, devices, or equipment.

The program code contained on the readable medium can be transmitted using any suitable medium, including but not limited to wireless, wired, optical cable, RF, or any suitable combination thereof.

The program code for performing the operations described in the present disclosure can be written in one programming language or any combination of multiple programming languages. The programming language includes object-oriented programming languages such as Java and C++, and includes conventional procedural programming languages such as "C" or similar programming languages. The program code can be executed entirely on the computing device of a user, partially on a device of a user, as a standalone software package, partially on the computing device of a user and partially on a remote computing device, or entirely on a remote computing device or server. In cases involving a remote computing device, the remote computing device can be connected to the computing device of a user via any kind of network, including a local area network (LAN) or a wide area network (WAN), or it can be connected to external computing devices (such as through an Internet service provider over the Internet).

The program product can be implemented using any combination of one or more readable media. The readable media can be either readable signal media or readable storage media. The readable storage media can include, but is not limited to, systems, control devices, or devices using electrical, magnetic, optical, electromagnetic, infrared, or semiconductor systems, or any combination of the above. More specific examples of readable storage media (non-exhaustive list) include devices with one or more wires, electrical connections, portable disks, hard drives, random-access memory (RAM), read-only memory (ROM), erasable programmable read-only memory (EPROM or flash memory), optical fibers, portable compact disc read-only memory (CD-ROM), optical storage devices, magnetic storage devices, or any suitable combination of the above.

The program product for the embodiments of the present disclosure, used for system permission activation, can be implemented using a portable compact disc read-only memory (CD-ROM). It includes program code and can be executed on a computing device. However, the program product for the embodiments of the present disclosure is not limited to this. In the present disclosure, the readable storage medium can be any tangible medium containing or storing a program, and the program can be used by an instruction execution system, a control device, or a device, or combined with it.

The present disclosure is described with reference to flowcharts and/or block diagrams illustrating methods, devices (systems), and computer program products according to embodiments of the present disclosure. It should be understood that each process and/or block in the flowcharts and/or block diagrams can be implemented by computer program instructions, and the combination of processes and/or blocks in the flowcharts and/or block diagrams can be realized by computer program instructions. The provided computer program instructions can be executed by a general-purpose computer, a dedicated computer, an embedded processor, or any processors of other programmable data processing devices to generate a machine that, when the instructions are executed by the processor of the computer or other programmable data processing device, implements the functionality specified in the one or more processes in the flowchart and/or one or more boxes in the block diagram.

These computer program instructions can also be stored in a computer-readable memory that is capable of booting a computer or other programmable data processing device to work in a specific manner. The instructions stored in the computer-readable memory are enabled to generate a product including an instruction apparatus. The instruction apparatus implements the functionality specified in one or more processes in the flowchart and/or one or more boxes in the block diagram.

These computer program instructions can also be loaded onto a computer or another programmable data processing device so as to allow the computer or other programmable device to execute a series of operational steps to produce processing implemented by the computer. The instructions executed on the computer or other programmable device provide steps for implementing the functionality specified in one or more processes in the flowchart and/or one or more boxes in the block diagram.

CONCLUSION

Disclosed in the present disclosure are a three-dimensional sorting control method, a three-dimensional sorting robot, and a related device. When a first three-dimensional sorting robot has a fault, the first three-dimensional sorting robot unbinds with the target sorting shelves. The state information of other three-dimensional sorting robots is acquired. When the state information indicates that a second three-dimensional sorting robot is in an available and idle state, the second three-dimensional sorting robot is rebound with the target sorting shelves. Therefore, after the three-dimensional sorting robots have a fault, existing idle robots that operate normally are used to rapidly participate in sorting, thereby achieving the technical aim of improving the overall sorting efficiency.

Although preferred embodiments of the present disclosure have been described, once those skilled in the art become aware of the basic inventive concept, they may make additional changes and modifications to these embodiments. Therefore, the appended claims are intended to be construed to include not only the preferred embodiments but also all changes and modifications falling within the scope of the present disclosure.

Clearly, those skilled in the art can make various alterations and modifications to the present disclosure without departing from the spirit and scope of the present disclosure. Thus, if these modifications and variations of the present disclosure fall within the scope of the claims and equivalent technologies, the present disclosure is also intended to include these modifications and variations.

INDUSTRIAL PRACTICALITY

The present disclosure discloses a three-dimensional sorting control method, a three-dimensional sorting robot, and a related device. The three-dimensional sorting control method can include three-dimensional sorting robots having a binding relationship with identity information of target sorting shelves, wherein the binding relationship is associated with a target order; under a sorting task of the target order, the three-dimensional sorting robots sorting, according to the identity information of the sorting shelves, goods to be sorted; when a first three-dimensional sorting robot has a fault, unbinding the first three-dimensional sorting robot and the target sorting shelves; acquiring state information of other three-dimensional sorting robots, when the state information indicates that a second three-dimensional sorting robot is in an available and idle state; and rebinding the second three-dimensional sorting robot with the target sorting shelves. Therefore, after the three-dimensional sorting robots have a fault, existing idle robots that operate normally are used to rapidly participate in sorting, thereby achieving the technical aim of improving the overall sorting efficiency.

Additionally, it can be understood that the three-dimensional sorting control method, three-dimensional sorting robot, and related device described in the present disclosure are reproducible and can be used in various industrial applications. For example, the three-dimensional sorting control method, the three-dimensional sorting robot, and the related device described in the present disclosure can be used in the technical field of sorting robots.

The embodiments of the invention in which an exclusive property or privilege is claimed are defined as follows:

1. A three-dimensional sorting control method, used for a three-dimensional sorting system, wherein the system comprises multiple three-dimensional sorting robots and sorting shelves, and the three-dimensional sorting control method comprises:

enabling the three-dimensional sorting robots to have a binding relationship with identity information of target sorting shelves, wherein the binding relationship is associated with a target order; under a sorting task of the target order, the three-dimensional sorting robots sorting, according to the identity information of the sorting shelves, goods to be sorted;

when a first three-dimensional sorting robot has a fault, unbinding the first three-dimensional sorting robot and the target sorting shelves;

acquiring state information of other three-dimensional sorting robots; and when the state information indicates that a second three-dimensional sorting robot is in an available and idle state, rebinding the second three-dimensional sorting robot with the target sorting shelves;

wherein enabling the three-dimensional sorting robots to have the binding relationship with the identity information of the target sorting shelves comprises:

reading labels arranged on the target sorting shelves to obtain the identity information, wherein the labels carry structural data of the sorting shelves and location information of basket units, wherein the structural data of the sorting shelves indicates a longitudinal and transverse structure of the sorting shelves and information about available baskets; and the location information of the basket units indicates positions of the basket units in a coordinate system formed by the sorting shelves;

the three-dimensional sorting system further comprises one or more platform sorting robots, wherein the platform sorting robots perform a goods delivery to the first three-dimensional sorting robot based on the target order; and when the first three-dimensional sorting robot has a fault, the method further comprises:

controlling the platform sorting robots to abandon the goods delivery to the first three-dimensional sorting robot;

determining that the target order is re-associated with a rebinding relationship between the second three-dimensional sorting robot and the target sorting shelves; and controlling the platform sorting robots to initiate a goods delivery to the second three-dimensional sorting robot based on the target order.

2. The three-dimensional sorting control method according to claim 1, wherein the step of acquiring state information of other three-dimensional sorting robots comprises:

determining operational state information and health state information of the multiple three-dimensional sorting robots, wherein the operational state information comprises the idle state, an in-use state, and a standby state; and the health state information comprises a fault state, an available state, and a test state;

determining that the operational state information of a three-dimensional sorting robot is the idle state, and the health state information is the available state, using the three-dimensional sorting robot as an alternative robot for the second three-dimensional sorting robot; and selecting an optimal robot from multiple alternative three-dimensional sorting robots to serve as the second three-dimensional sorting robot.

3. The three-dimensional sorting control method according to claim 1, wherein after rebinding the second three-dimensional sorting robot with the target sorting shelves, the three-dimensional sorting control method further comprises:

acquiring a sorting state when the first three-dimensional sorting robot has a fault, wherein the sorting state comprises incomplete sorting of the target sorting shelves and incomplete unloading of baskets of the target sorting shelves;

when the target sorting shelves are not completely sorted, binding the second three-dimensional sorting robot with the target sorting shelves; and when the unloading of the baskets of the target sorting shelves is not completed, placing goods with incomplete unloading onto the second three-dimensional sorting robot.

4. The three-dimensional sorting control method according to claim 1, wherein the step of controlling the platform sorting robots to abandon the goods delivery to the first three-dimensional sorting robot comprises:

the platform sorting robots responding to a fault signal of the first three-dimensional sorting robot acquired by a platform dispatch system;

the platform sorting robots pausing the goods delivery to the first three-dimensional sorting robot; and the platform sorting robots moving along a predetermined path until a binding between the second three-dimensional sorting robot and the target sorting shelves is completed.

5. The three-dimensional sorting control method according to claim 1, wherein the identity information of the target sorting shelves is realized by the three-dimensional sorting robots using RFID readers.

6. The three-dimensional sorting control method according to claim 1, wherein the step of the three-dimensional sorting robots sorting, according to the identity information of the sorting shelves, goods to be sorted comprises:

parsing sorting information of the goods to be sorted, wherein the sorting information carries a corresponding relationship with a basket unit in the sorting shelves;

searching a corresponding relationship table to obtain coordinate values of the basket unit in a three-dimensional coordinate system formed by the sorting shelves; and indexing the coordinate values and locating the basket unit, to deliver the goods to be sorted to the basket unit.

7. The three-dimensional sorting control method according to claim 1, wherein the three-dimensional sorting system further comprises a control bus, and the step of acquiring state information of other three-dimensional sorting robots comprises:

acquiring state information of other three-dimensional sorting robots on the control bus.

8. A three-dimensional sorting control system, wherein the three-dimensional sorting control system is configured in the three-dimensional sorting system; and the three-dimensional sorting control system executes the three-dimensional sorting control method according to claim 1.

9. The three-dimensional sorting control system according to claim 8, wherein the system implements the execution of the three-dimensional sorting control method through a server in the three-dimensional sorting control system.

10. The three-dimensional sorting control system according to claim 8, wherein the three-dimensional sorting control system is provided with a host computer or central controller to allocate sorting tasks to the three-dimensional sorting robot.

11. A three-dimensional sorting system, wherein a first three-dimensional sorting robot and a second three-dimensional sorting robot are configured in the three-dimensional sorting system and the first three-dimensional sorting robot has a binding relationship with identity information of target sorting shelves, and the binding relationship is associated with a target order; under a sorting task of the target order, the first three-dimensional sorting robot sorts, according to the identity information of the sorting shelves, goods to be sorted;

when the first three-dimensional sorting robot has a fault, the first three-dimensional sorting robot unbinds with the target sorting shelves;

a server acquires state information of other three-dimensional sorting robots; and when the state information indicates that the second three-dimensional sorting robot is in an available and idle state, the second three-dimensional sorting robot rebinds with the target sorting shelves;

wherein the three-dimensional sorting robots having the binding relationship with the identity information of the target sorting shelves comprises:

reading labels arranged on the target sorting shelves to obtain the identity information, wherein the labels carry structural data of the sorting shelves and location information of basket units, wherein the structural data of the sorting shelves indicates a longitudinal and transverse structure of the sorting shelves and information about available baskets; and the location information of the basket units indicates positions of the basket units in a coordinate system formed by the sorting shelves;

the three-dimensional sorting system comprises one or more platform sorting robots, wherein the platform sorting robots perform a goods delivery to the first three-dimensional sorting robot based on the target order;

when the first three-dimensional sorting robot has a fault, the platform sorting robots abandon the goods delivery to the first three-dimensional sorting robot and periodically interrogate a state of the target order; and when the target order is re-associated with a rebinding relationship between the second three-dimensional sorting robot and the target sorting shelves, the second three-dimensional sorting robot accepts the goods delivery from the platform sorting robots based on the target order.

12. The three-dimensional sorting system according to claim 11, wherein operational state information and health state information of multiple three-dimensional sorting robots are determined, wherein the operational state information comprises the idle state, an in-use state, and a standby state; the health state information comprises a fault state, an available state, and a test state;

when the operational state information of a three-dimensional sorting robot is the idle state and the health state information is the available state, the three-dimensional sorting robot is used as an alternative robot for the second three-dimensional sorting robot; and a predetermined rule is used to select an optimal robot from multiple alternative three-dimensional sorting robots to serve as the second stereoscopic three-dimensional sorting robot.

13. The three-dimensional sorting system according to claim 11, wherein the identity information of the target sorting shelves is realized by the three-dimensional sorting robot using RFID readers.

14. The three-dimensional sorting system according to claim 11, wherein the three-dimensional sorting robot is arranged in the three-dimensional sorting system via a bus structure.

* * * * *